United States Patent
Yoshimura

(10) Patent No.: US 8,045,023 B2
(45) Date of Patent: Oct. 25, 2011

(54) APPARATUS AND METHOD FOR INTERMEDIATE IMAGE-FORMATION OF INFORMATION PROPAGATING AS WAVE MOTION PASSING THROUGH OPEN HOLE AND FOR IMAGE PICK-UP

(75) Inventor: Hirokazu Yoshimura, Souka (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 998 days.

(21) Appl. No.: 10/562,661

(22) PCT Filed: Jun. 29, 2004

(86) PCT No.: PCT/JP2004/009149
§ 371 (c)(1),
(2), (4) Date: Oct. 11, 2006

(87) PCT Pub. No.: WO2005/002213
PCT Pub. Date: Jan. 6, 2005

(65) Prior Publication Data
US 2007/0052826 A1  Mar. 8, 2007

(30) Foreign Application Priority Data

Jun. 30, 2003  (JP) .................................. 2003-186266

(51) Int. Cl.
*H04N 5/217* (2011.01)
(52) U.S. Cl. ......... 348/241; 348/243; 348/246; 348/247
(58) Field of Classification Search .................. 348/241, 348/243, 246, 247
See application file for complete search history.

(56) References Cited

U.S. PATENT DOCUMENTS

| | | | | |
|---|---|---|---|---|
| 4,861,163 A | * | 8/1989 | Bach | 356/417 |
| 5,760,403 A | * | 6/1998 | Elabd | 250/370.11 |

FOREIGN PATENT DOCUMENTS

| | | |
|---|---|---|
| JP | 60-502119 | 12/1985 |
| JP | 1-209884 | 8/1989 |
| JP | 4-61570 | 2/1992 |
| JP | 5-225933 | 9/1993 |
| JP | 05225933 A * | 9/1993 |
| JP | 5-308481 | 11/1993 |
| JP | 2000-300546 | 10/2000 |
| JP | 2003-85542 | 3/2003 |

* cited by examiner

*Primary Examiner* — Yogesh Aggarwal
(74) *Attorney, Agent, or Firm* — Oblon, Spivak, McClelland, Maier & Neustadt, L.L.P.

(57) ABSTRACT

An opening is made in a surface intercepting a wave propagating through space. An image of an object is formed on an intermediate surface from the wave passing through this opening. After wave conversion, that is to say, after the entity of a wave is converted into a detectable wave from which a two-dimensional image can be picked up, an image is picked up with a two-dimensional image pick-up device. Distortion caused by the two-dimensional image pick-up device is corrected using a calibration grid pattern provided on the intermediate surface. The intermediate surface provides a wave converting function, distortion calibrating function, distortion-free wide field of view ensuring function, and wave entity converting function, and a place of detection elements themselves.

15 Claims, 2 Drawing Sheets

APPARATUS AND METHOD FOR INTERMEDIATE IMAGE-FORMATION OF INFORMATION PROPAGATING AS WAVE MOTION PASSING THROUGH OPEN HOLE AND FOR IMAGE PICK-UP

TECHNICAL FIELD

The present invention relates to an apparatus including an opening made in a surface for intercepting a wave motion propagating through space. The apparatus forms an image of an object on an intermediate surface by a wave motion passing through the opening and picks up the image.

BACKGROUND ART

Hitherto, images of particular objects have been formed using light or other electromagnetic waves in various fields of science and technology. Image-forming systems using opening, which have been developed from the concept of a pinhole, are fundamental systems for such image formation. Light and other electromagnetic waves, which are examples of wave motion, have a characteristic that no distortion occurs in spatial projection.

DISCLOSURE OF INVENTION

In the present image-forming systems using an opening and having an interrupter that intercepts a wave motion, the opening being made in the interrupter, an image is formed geometrically due to rectilinear propagation of a wave front. However, the formed image is blurred due to diffraction nature of the waves. The shorter the wavelength is, the smaller the blurring by the diffraction becomes. In the case of electromagnetic waves, blurring caused by diffraction becomes smaller as the wavelength becomes shorter from visible light to extreme ultraviolet light, soft X-rays, hard X-rays, and gamma rays. In the case of quantum waves, which are also a wave motion due to dual wave-particle nature of particles having mass, this blurring is much smaller than that of electromagnetic waves in general. These image-formation systems, using an opening, have the characteristic that the longer the distance between the opening and the formed image is, the higher and the larger the optimum spatial resolution and the optimum diameter of the opening become. In general, waves with particular wave length which we aim to detect can be different from the waves that an appropriate and feasible two-dimensional image pick-up device can detect. Therefore, an intermediate wave-converting surface is provided between an opening and a two-dimensional image pick-up device to form an undistorted image on the wave-converting surface. The image is converted into waves with a certain wavelength, normally light, which is an electromagnetic wave with a wavelength that, for example, an inexpensive optical CCD camera can detect. The image is then picked up by the CCD camera. In this step, since the CCD camera forms an image using, for example, optical lenses, distortion can occur. The distortion in this case is characterized by the lenses of the CCD camera. These characteristics are described in advance by a one-to-one function between a coordinate system on the intermediate wave-converting surface and a coordinate on the two-dimensional image pick-up element. The distortion of the image formed by the two-dimensional image pick-up element is corrected using this function in real time or later with a computer. In this way, a numeric-value image having no distortion can be stored on a recording medium. In addition, this intermediate surface can act as a means to pick-up the image itself with properly distributed detectors on the intermediate surface. The surface also can act as a means to make the field of view of the object from the opening wide or narrow by making the distance between the opening and the surface short or long. The waves include electromagnetic waves, quantum waves, and waves corresponding to the actual mass or media motion, such as sound waves, and all other kinds of waves. Therefore, the intermediate wave-converting surface acts as a means not only to convert a wave length but also to convert the entity and nature of a wave.

The present invention provides a system for formation and picking up images from information propagating in space in form of waves. The waves are not limited to electromagnetic waves of photons having no mass. As we have already stated above, the waves include quantum waves of particles having a finite mass due to wave-particle duality, for example, electrons, neutrons, or neutrinos.

To materialize the above-described configuration, the present invention has the following aspects:

[1] A method for picking up an image by using a combination of an opening and a two-dimensional image pick-up device. A wave converter for transforming a wave into a wave of different kind is provided between a single opening or a plurality of openings and a two-dimensional image pick-up device. The wave converter transforms an image formed from a wave coming from the opening into a wave that the two-dimensional image pick-up device can detect (hereinafter referred to as detectable wave). An image of the detectable wave is caught and picked up with the two-dimensional image pick-up device.

[2] A method for picking up an image by using a combination of an opening and a two-dimensional image pick-up device. A wave converter for converting a wave is provided between a single opening or a plurality openings and a two-dimensional image pick-up device. The wave converter transforms an image formed from a wave coming from the opening into a detectable wave. An image of the detectable wave is caught and picked up with the two-dimensional image pick-up device. The image picked up with the two-dimensional image pick-up device is calibrated with a computer and output.

[3] A method for picking up an image by using a combination of an opening and a two-dimensional image pick-up device according to [2]. The wave converter includes a wave-converting surface having a calibration grid pattern. Distortion caused by lenses of the two-dimensional image pick-up device is calibrated using information of the calibration grid pattern.

[4] A method for picking up an image by using a combination of an opening and a two-dimensional image pick-up device according to [1] or [2]. The diameter of the opening is large, and the distance between the opening and the image-forming surface of the intermediate wave converter is long.

[5] A method for picking up an image by using a combination of an opening and a two-dimensional image pick-up device according to [1] or [2]. By using the waves from the opening, the diameter of the opening is reduced, and the distance between the opening and the image-forming surface of the intermediate wave converter is reduced.

[6] A method for picking up an image by using a combination of an opening and a two-dimensional image pick-up device. The apparatus includes a single opening or a plurality of openings, a cylinder, a wave converter, and a two-dimensional image pick-up device. The cylinder integrates the opening and the two-dimensional image pick-up device for visible light. The cylinder is long so that the distance between the opening and the image-forming surface of the intermediate wave converter is long. The wave converter converts a wave (specifically, X-ray, gamma ray, quantum wave ray having mass, or a sound wave) coming from the opening into a detectable wave. The two-dimensional image pick-up device picks up an image from the converted detectable wave.

[7] An apparatus for picking up an image by using a combination of an opening and a two-dimensional image pick-up device. The apparatus includes a single opening or a plurality of openings, a cylinder, a wave converter, and a two-dimensional image pick-up device. The cylinder integrates the opening and the two-dimensional image pick-up device for visible light. The cylinder is short so that the distance between the opening and the two-dimensional image pick-up device for visible light is short. The wave converter transforms a wave (specifically, an X-ray, a gamma ray, a quantum ray having mass, or a sound wave) coming from the opening into a detectable wave. The two-dimensional image pick-up device picks up an image from the converted detectable wave.

[8] An apparatus for picking up an image by using a combination of an opening and a two-dimensional image pick-up device. The apparatus includes a single opening or a plurality of openings, a cylinder in which the opening is formed, a wave converter for transforming a wave coming from the opening into a detectable wave, a two-dimensional image pick-up device for picking up an image from the converted detectable wave, and a means for calibrating the image picked up by the two-dimensional image pick-up device with a computer.

[9] An apparatus for picking up an image by using a combination of an opening and a two-dimensional image pick-up device according to [8]. The wave converter includes a wave-converting surface having a calibration grid pattern. Image distortion caused by the two-dimensional image pick-up device is calibrated using information of the calibration grid pattern.

[10] An apparatus for picking up an image by using a combination of an opening and a two-dimensional image pick-up device according to [8]. The diameter of the opening is large, and the cylinder is long so that the distance between the opening and the image-forming surface of the wave-converting surface is long.

[11] An apparatus for picking up an image by using a combination of an opening and a two-dimensional image pick-up device according to [8]. When X-ray or gamma ray as a wave from the opening is used, the diameter of the opening is reduced, and the length of the cylinder is reduced so that the distance between the opening and the image-forming surface of the wave-converting surface is reduced.

[12] An apparatus for picking up an image by using a combination of an opening and a two-dimensional image pick-up device according to [8]. Distortion caused by the spatial image-forming system and lens image-forming system is automatically corrected by a computer using the calibration grid pattern of the wave-converting surface, and a distortion-free signal is output from the two-dimensional image pick-up device.

[13] An apparatus and a method for picking up an image by using a combination of an opening and a wave converter which also works as two-dimensional image pick-up device by properly distributed pick up elements on the wave converting plane.

BEST MODE FOR CARRYING OUT OF THE INVENTION

The preferred embodiments of the present invention will now be described in detail.

As described above, in the case of light or electromagnetic waves, which are examples of waves, wave-image-forming systems using an opening are advantageous in that no distortion occurs in spatial projection, but are disadvantageous in that the image blurring occurs due to diffraction and therefore the resolution deteriorates. The longer the distance from the opening to the image-forming surface is, the higher the optimum resolution becomes, that is to say, the sharper the entire image becomes.

However, as described above, the longer the distance from the opening to the image-forming surface is made, the larger the entire image is formed. Therefore, if the image is larger than the image pick-up region of an existing CCD, the image cannot be formed directly on the CCD and recorded.

To solve this problem, in the present invention, first, an image is formed on a flat plate called an intermediate wave-converting surface, and then this image is recorded with a wide-field CCD camera. This wave-converting surface converts a wave to be used into a wave that the CCD can detect, that is to say, into an electromagnetic wave of a wavelength that can be detected by the CCD. In this step, since wide-field cameras form an image using optical lenses or similar imaging device, in general, distortion can occur. In this case, this distortion is characterized by the lenses of the CCD camera. These characteristics are described in advance by a one-to-one function between a coordinate on the intermediate wave-converting surface and a coordinate on the two-dimensional image pick-up element. The distortion of the image formed by the two-dimensional image pick-up element is corrected using this function in real time or later with a computer. In this way, a numeric-value image having no distortion can be recorded on a recording medium.

Figure 1:
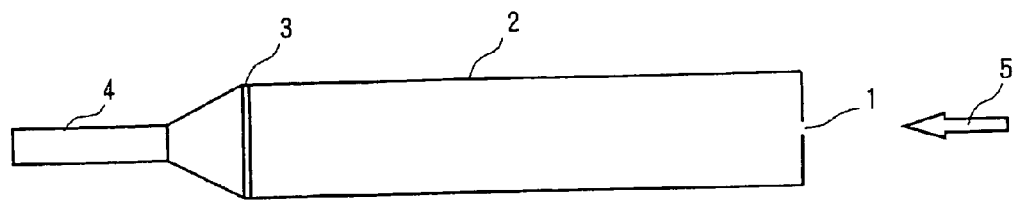
FIG. 1 is an external view of an image pick-up optical apparatus combining an opening and a CCD according to the present invention.

FIG. 1 is an external view of an image pick-up optical apparatus combining an opening and a CCD camera according to the present invention. In this figure, reference numeral 1 denotes a relatively large-diameter opening to achieve an optimum resolution, reference numeral 2 denotes a long cylinder, reference numeral 3 denotes a wave-converting surface, and reference numeral 4 denotes a CCD camera. The wave converting surface 3 receives an electromagnetic wave 5 (short-wavelength light such as extreme ultraviolet light, soft X-rays, hard X-rays, or gamma rays) through the opening 1 and converts the electromagnetic wave into visible light. The CCD camera 4 picks up an image from the visible light converted by the wave-converting surface 3.

Figure 2:
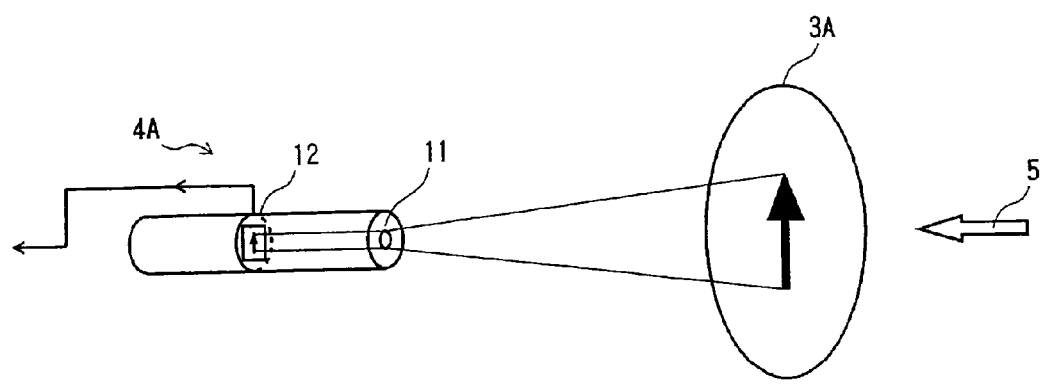
FIG. 2 is a schematic view of an image pick-up optical apparatus combining an opening and a CCD according to a first embodiment of the present invention.

FIG. 2 is a schematic view of an image pick-up optical apparatus combining an opening and a CCD according to a first embodiment of the present invention.

In this figure, an incident electromagnetic wave 5 is converted into visible light by the wave-converting surface 3A (that has, for example, dot-like elements that emit light detectable wave length when irradiated with the electromagnetic wave 5). The converted visible light passes through a lens image-forming system 11, is picked up by the CCD image-forming surface 12, and is output as an image.

Figure 3:
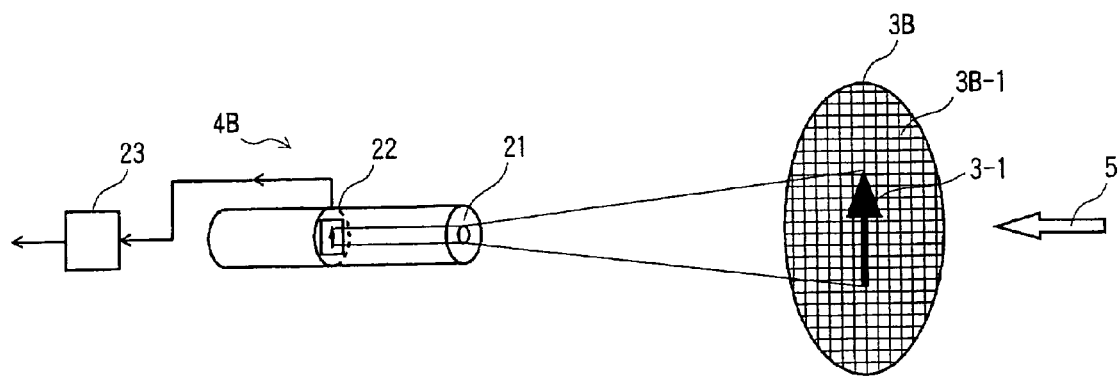
FIG. 3 is a schematic view of an image pick-up optical apparatus combining an opening and a CCD according to a second embodiment of the present invention.
Figure 4:
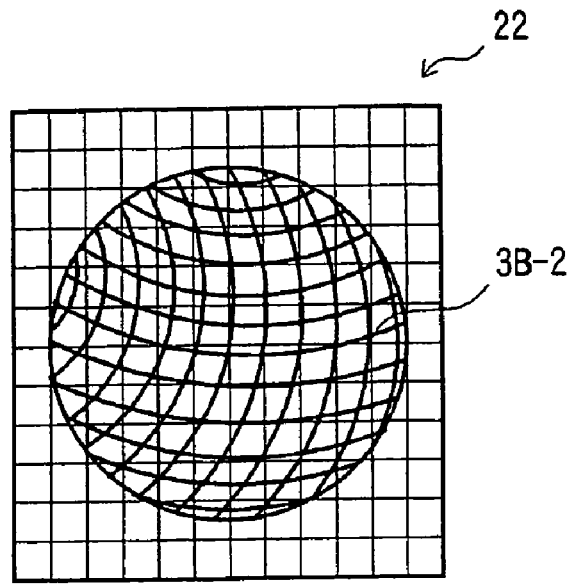
FIG. 4 is a schematic view illustrating image distortion caused by a spatial image-forming system and lenses using a calibration grid pattern of a wave-converting surface in the image pick-up optical apparatus combining an opening and a CCD camera according to the second embodiment of the present invention.

FIG. 3 is a schematic view of an image pick-up optical apparatus combining an opening and a CCD according to a second embodiment of the present invention. FIG. 4 is a schematic view illustrating image distortion caused by a spatial image-forming system and lens image-forming system using a calibration grid pattern of a wave-converting surface.

In these figures, an incident electromagnetic wave 5 is converted into visible light by the wave-converting surface 3B having a calibration grid pattern 3B-1. The converted visible light passes through a lens image-forming system 21 and is picked up by the CCD image-forming surface 22. A computer 23 is provided in order to make the picked-up image on the CCD image-forming surface 22 properly correspond to the image on the wave-converting surface 3B having the calibration grid pattern 3B-1, and to calibrate the distortion of the image.

In this embodiment, an image 3B-2 of the calibration grid pattern 3B-1 is formed by the lens image-forming system 21, and the computer 23 makes the image 3B-2 correspond to the grid pattern of the CCD image-forming surface 22, that is to say, the computer 23 calibrates the distortion of the image output from the CCD image-forming surface 22. For example, in FIG. 3, the large arrow 3-1 on the wave-converting surface 3B having the calibration grid pattern 3B-1 shows the image when an electromagnetic wave (for example, a gamma ray) 5 coming from the opening 1 is converted by the wave-converting surface 3B into visible light. This arrow 3-1 on the wave-converting surface 3B is picked up by the CCD image-forming surface 22 in the CCD camera 4B and output as a distorted image. Therefore, distortion of the image is calibrated by the computer 23, and a correct image is output.

In this step, the number of squares of the calibration grid pattern corresponds to the spatial resolution required for the application.

Figure 5:
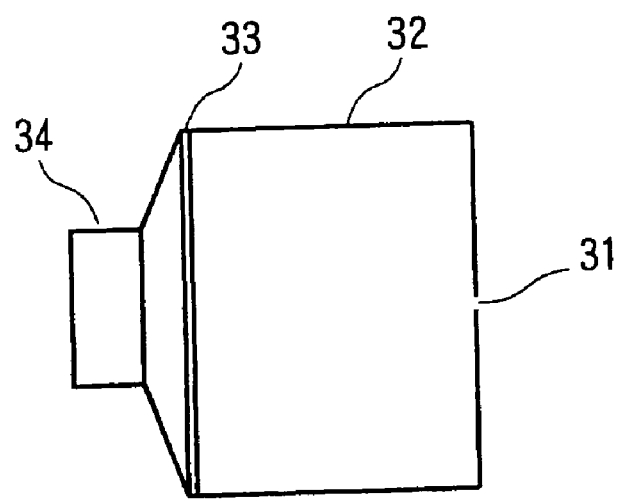
FIG. 5 is a schematic view of an image pick-up optical apparatus combining an opening, a wave converter, and a CCD according to a third embodiment of the present invention.

FIG. 5 is a schematic view of an image pick-up optical apparatus combining an opening, a wave converter, and a CCD according to a third embodiment of the present invention. This embodiment is applied to medical X-ray image pick-up.

In this figure, reference numeral 31 denotes a relatively small-diameter opening to achieve an optimum resolution, reference numeral 32 denotes a short cylinder, reference numeral 33 denotes a wave-converting surface that converts X-rays, and reference numeral 34 denotes a CCD camera.

In this embodiment, since an X-ray, which has a short wavelength, is taken in, the diameter of the opening 31 need not be large, and the distance from the opening 31 to the image-forming surface need not be long, and therefore the cylinder 32 is short.

Incidentally, although not shown here, in this embodiment, as in the above embodiment, the distortion of an image enlarged by the wave-converting surface 33 having a calibration grid pattern and received by a CCD image-forming surface may be calibrated with a computer to output a correct image.

In the third embodiment, in addition to the configuration of the first and second embodiments, the image pick-up optical apparatus can be downsized.

When this embodiment is used for medical X-ray image pick-up, unlike X-ray photographs that are now commonly used, time and trouble for development can be saved, and an X-ray image can be seen in real time with a normal CCD camera.

This example is illustrative only. The electromagnetic wave coming from the opening may be a gamma ray, which has a wavelength shorter than that of an X-ray. The present invention has a broad range of applications, for example, other medical fields, astronomy fields, and image pick-up in a nuclear reactor. In addition, the present invention can be applied to microscopy fields, for example, controlling atomic arrangement in the case where image formation of accurate structure pattern is required. Moreover, the present invention can be applied to accurate image formation and image pick-up of the inside of the human body by ultrasound.

When a wave is converted by the present invention, waves that the currently feasible and economical optical CCD cannot catch can be caught by the normal optical CCD. In addition, even in the case where the field of view is wider than the image pick-up region of the CCD due to use of an opening, a wide field of view can be ensured by using a wave-converting surface, and spatial distortion can be corrected or automatically corrected by using a calibration grid pattern. Moreover, a primary image having no spatial distortion can be formed by using an opening. It is also possible to combine these advantages. In this case, the wave-converting surface has two functions. (1) The wave-converting surface converts an electromagnetic wave into an electromagnetic wave with a wavelength from which a CCD camera can pick up an image. (2) The surface picks up an image over a wide field of view.

In the above embodiment, a CCD camera serves as a two-dimensional image pick-up device. Alternatively, images may be picked up with a MOS (metal oxide semiconductor) camera or a vision camera.

Alternatively, a two-dimensional image pick-up device having a rare earth phosphor and an amorphous silicon sensor, which has a high spatial resolution and in which image distortion is small, may be used.

A lens system is shown as an image-forming system in the present invention. However, a lens system combined with a reflecting mirror may be used.

It is to be understood that the present invention is not intended to be limited to the above-described embodiment, and various changes may be made therein without departing from the spirit of the present invention. Such changes are also included in the scope of the present invention.

As described above, the present invention has the following advantages.

(A) By using a long cylinder with a relatively large-diameter opening to achieve optimum resolution, or, in the case of X-ray image pick-up, by using a short cylinder with a small-diameter opening, a method and apparatus for high-resolution image formation combining an opening and a two-dimensional image pick-up device can be obtained.

(B) By converting a wave, a wavelength region that current two-dimensional image pick-up devices cannot catch can be caught by a normal optical two-dimensional image pick-up device.

(C) Even in the case where the field of view is wider than the image pick-up region of the two-dimensional image pick-up device due to the use of an opening, a wide field of view can be ensured by using a wave-converting surface.

(D) By using a calibration grid pattern, spatial distortion can be corrected a posteriori or automatically corrected in real time.

(E) By using an opening, a primary image having no spatial distortion can be formed.

(F) When the present invention is used in medical X-ray image pick-up, the image-forming optical apparatus can be downsized. In addition, unlike the conventional X-ray photographs, time and trouble for development can be saved. Moreover, an X-ray image can be obtained in real time with a normal CCD camera. The present invention provides a means to obtain distortion free images in such applications.

INDUSTRIAL APPLICABILITY

The intermediate image-forming and image pick-up apparatus and image pick-up method from information propagating in the form of a wave passing through an opening according to the present invention can be applied to an apparatus for picking up a medical X-ray image, an apparatus for forming and picking up an image by ultrasound waves, an apparatus for forming and picking up an image by electromagnetic waves such as X-rays and gamma rays that are radiation in a nuclear reactor or a quantum wave as a particle ray, and accurate image-formation for controlling atomic arrangement in nanotechnology.

The invention claimed is:

1. A method for forming and picking up an image by using an apparatus having a frontal plane with an opening, an intermediate plane, and a two-dimensional image pick-up device, the method comprising the steps of:
    forming a first undistorted image of an object by waves of a first kind through the opening of the frontal plane onto a front surface of the intermediate plane;
    converting the waves of the first kind that formed the first undistorted image of the object to waves of a second kind emitting from the rear surface of the intermediate plane, the intermediate plane acting as a wave converter from the waves of the first kind to the waves of the second kind, the waves of the second kind detectable by the two-dimensional image pick-up device;
    forming a second distorted image by waves of the second kind onto an image sensor of the two-dimensional image pick-up device; and
    outputting a corrected image of the object by the two-dimensional image pick-up device, by using information of the first undistorted image and second distorted image for distortion calibration.

2. The method for forming and picking up an image according to claim 1, wherein the intermediate plane includes a calibration grid pattern as a coordinate reference for the intermediate plane, the method further comprising the steps of:
    correcting the distortion of the second distorted image to output the corrected image of the object with a computer by using information of a correspondence between digital coordinate of the first undistorted image with reference to the calibration grid pattern and the digital coordinate of the second distorted image; and
    outputting a corrected image of the object by correcting image distortion by establishing a one-to-one correspondence between discrete points of the first undistorted image and discrete points of pixel of the image sensor by using a correspondence table having the one-to-one correspondence, and by using the correspondence table between grid points of the intermediate plane and grid points of the image sensor.

3. The method for forming and picking up an image according to claim 2, wherein the number of grid points of the calibration grid pattern is large enough to satisfy the accuracy of the spatial distortion of an application processing the outputted corrected image.

4. The method for forming and picking up an image according to claim 2, wherein a diameter of the opening is large, and a distance between the opening and the intermediate plane is long in comparison with a size of the intermediate plane, so that the first undistorted image on the intermediate plane is large and an optimum spatial resolution of the image can be achieved.

5. The method for forming and picking up an image according to claim 2, wherein a diameter of the opening is small, and a distance between the opening and the intermediate plane is short in comparison with a size of the intermediate plane, so that the first undistorted image on the intermediate plane is small and an optimum spatial resolution of the image can be achieved.

6. The method for forming and picking up according to claim 2, wherein wave-detecting elements of the intermediate plane are placed at grid points of the calibration grid pattern, by making a space where the grid points are placed large enough and a length between the opening and the intermediate plane long enough and the first undistorted image on the intermediate plane large enough so that the intermediate plane itself serves as a two-dimensional image pick-up device.

7. The method for forming and picking up an image according to claim 1, wherein the waves of the first kind are X-rays or gamma rays.

8. The method for forming and picking up an image according to claim 1,
    wherein in said step of forming a first undistorted image, the waves of the first kind are passed through the opening without passing through a lens.

9. The method for forming and picking up an image according to claim 1,
    wherein in said step of outputting the corrected image of the object, the intermediate plane acts as the image sensor of the two-dimensional image pick-up device by directly placing a multitude of wave sensors and wave pick-up elements on the intermediate plane.

10. An apparatus for forming and picking up an image comprising:
    a frontal plane having an opening acting as a primary image forming system by using waves of a first kind;
    an intermediate plane;
    a secondary image forming system using waves of a second kind, including at least one of lenses and mirrors;
    a two-dimensional image pick-up device; and
    a housing for integrating the frontal plane, the intermediate plane, the secondary image forming system, and the two-dimensional image pick-up device; wherein the frontal plane forms a first undistorted image of an object by waves of a first kind through the opening of the frontal plane onto a front surface of the intermediate plane;
    the intermediate plane converts the waves of the first kind forming the first undistorted image of the object to waves of a second kind emitted from a rear surface of the intermediate plane and acts as a wave converter from the waves of the first kind to the waves of the second kind, the waves of the second kind detectable by the two-dimensional image pick-up device;
    the secondary image forming system including at least one of lenses and mirrors forming a second distorted image by the waves of the second kind onto an image sensor of the two-dimensional image pick-up device; and the two-dimensional image pick-up device outputs a corrected image of the object by the two-dimensional image pick-up device, the correction being done by using information of the first undistorted image and the second distorted image for distortion calibration.

11. The apparatus for forming and picking up an image according to claim 10, wherein the intermediate plane includes a calibration grid pattern.

12. The apparatus for forming and picking up an image according to claim 10, wherein the waves of the first kind are visible waves or sound waves.

13. The apparatus for forming and picking up an image according to claim 10, wherein distortion caused by the secondary imaging system is produced by at least one of lenses or mirrors, the apparatus further comprising:

a computer for automatically correcting the waves of the second kind by using the calibration grid pattern of the intermediate plane; and an output unit for outputting a corrected signal of an image.

14. The apparatus for forming and picking up an image according to claim 10, wherein the frontal plane having the opening intercepts the propagation of the waves of the first kind without the waves of the first kind passing through a lens.

15. The apparatus for forming and picking up an image according to claim 10, wherein in the outputting of the corrected image of the object, the intermediate plane acts as the image sensor of the two-dimensional image pick-up device by directly placing a multitude of wave sensors and wave pick-up elements on the intermediate plane.

* * * * *